Aug. 17, 1943.  E. NORRMAN  2,326,880
DISTANCE MEASURING DEVICE
Filed Dec. 23, 1940  4 Sheets-Sheet 3
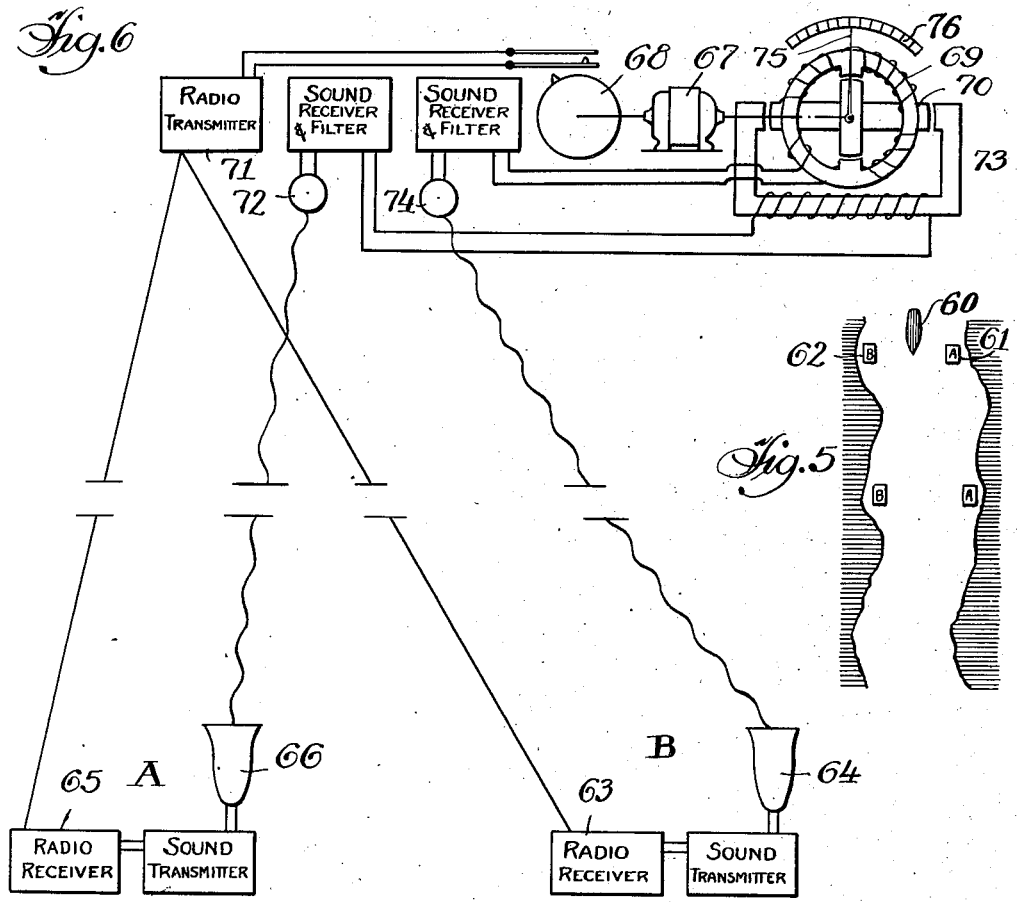
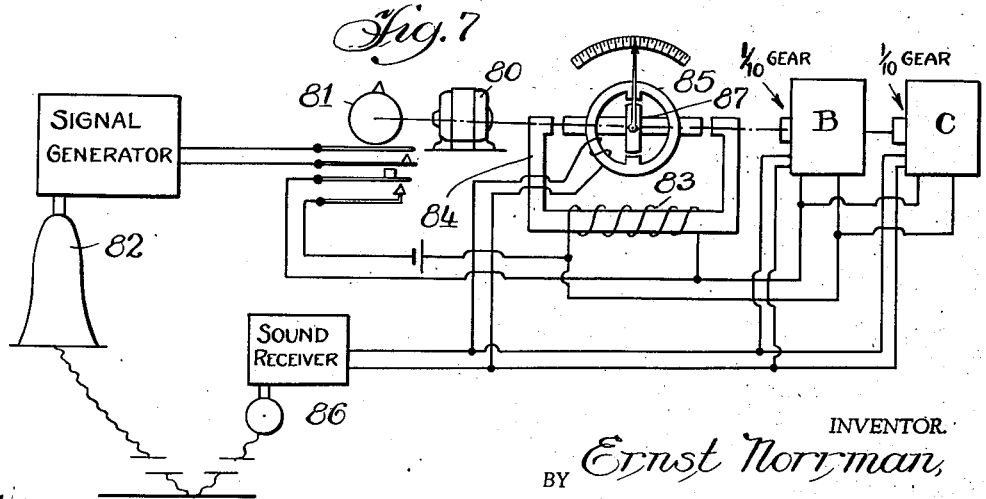
INVENTOR.
Ernst Norrman,
BY Chritton, Wiles, Davies, Hirschl & Dawson, Attys.

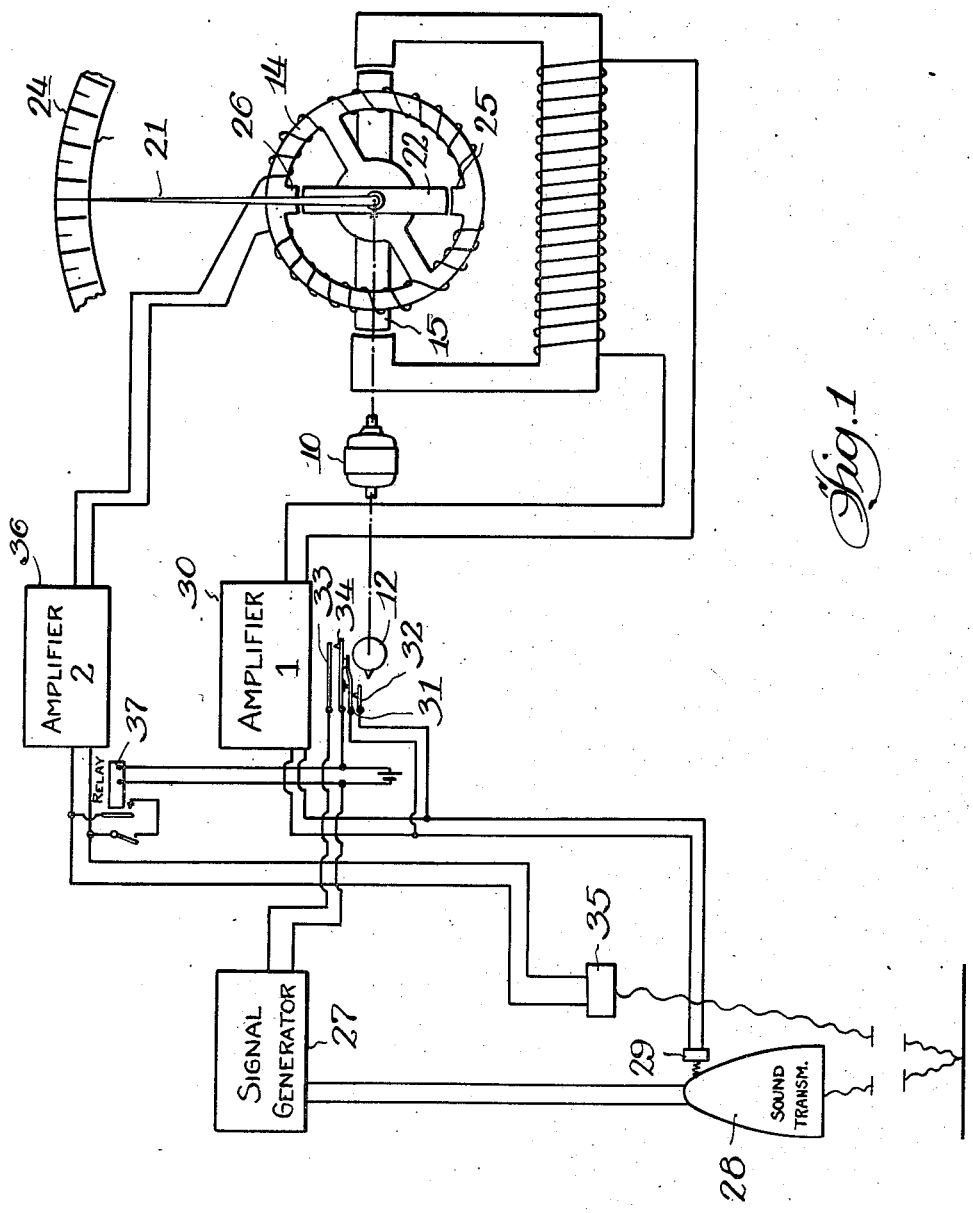

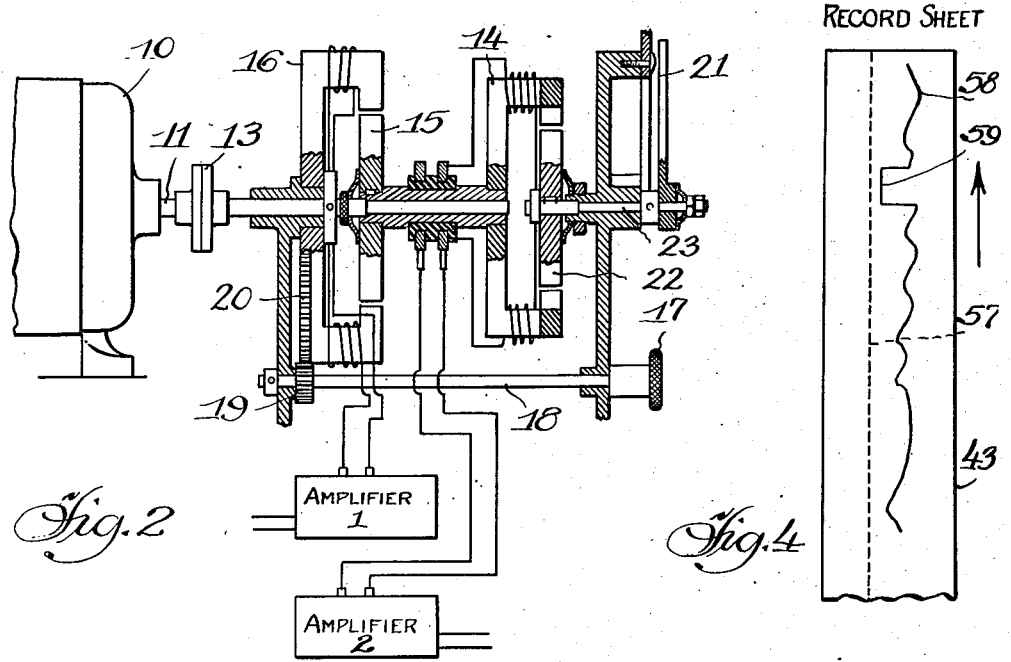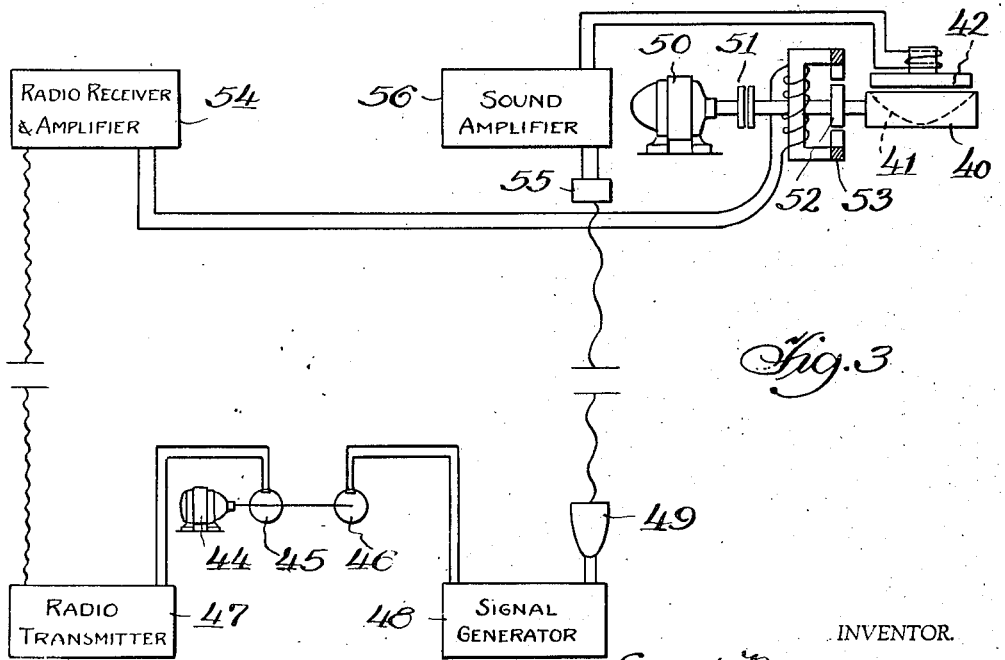

Aug. 17, 1943.   E. NORRMAN   2,326,880
DISTANCE MEASURING DEVICE
Filed Dec. 23, 1940   4 Sheets-Sheet 4

INVENTOR.
Ernst Norrman,
BY
Witness: Chritton, Wiles, Davies, Hirschl and Dawson Attys.

Patented Aug. 17, 1943

2,326,880

UNITED STATES PATENT OFFICE 2,326,880

DISTANCE MEASURING DEVICE

Ernst Norrman, Delavan, Wis.

Application December 23, 1940, Serial No. 371,454

9 Claims. (Cl. 177—386)

This invention relates to a distance-measuring device, and more particularly to means for providing a continuous automatic indication of a distance measurable by the propagation and reception of waves.

Figure 8:
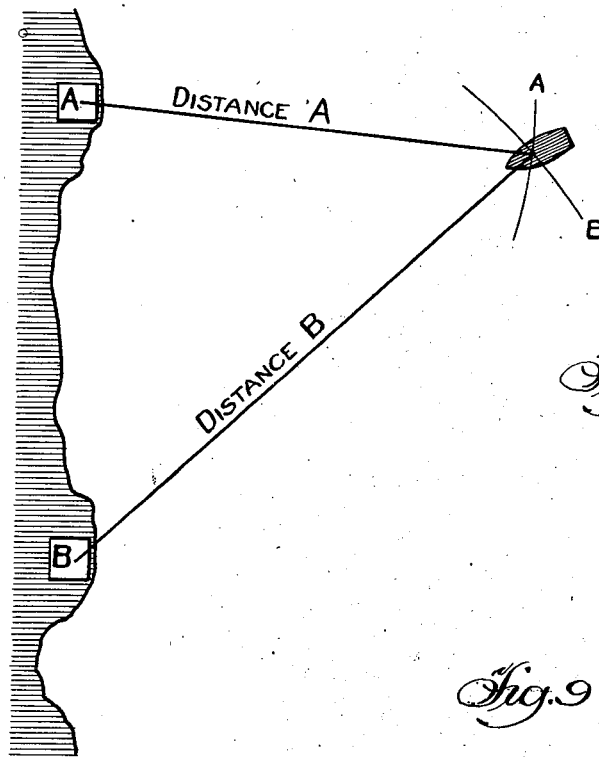
Figure 9:
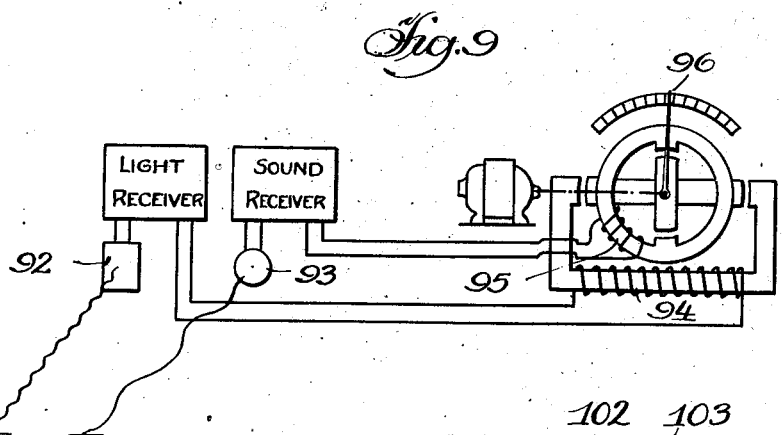
Figure 10:
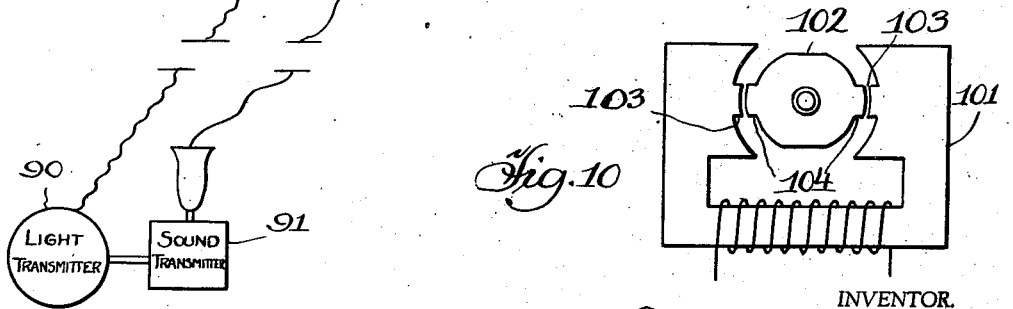

One feature of this invention is that it automatically provides a continuous indication of a distance, the indication being continuous in the sense that the distance at any instant may be determined merely by glancing at the indicating portion of the device and reading the distance from calibrations from a scale thereon, there being no necessity for manual manipulation of anything, or any calculations; another feature of this invention is that it automatically compensates for minute time variations in the propagation of the wave being used for the measurement, and in receiving and amplifying such wave; yet another feature of this invention is that it is readily adapted to provide a highly accurate permanent record of the distance being measured; other features and advantages of the invention will be apparent from the following specification and the drawings, in which:

Figure 1 is an illustration, principally diagrammatic, of one form of my invention; Figure 2 is a detail vertical sectional view of the indicating portion of the apparatus; Figure 3 is a diagrammatic showing of a modified form of my invention; Figure 4 is a plan view of the permanent record provided by the apparatus shown in Figure 3; Figure 5 is a schematic representation of one use to which my invention may be put; Figure 6 is a schematic showing of an embodiment of my invention particularly intended for this latter use; Figure 7 is a diagrammatic showing of an embodiment of my invention particularly designed for measurement of relatively long distances; Figure 8 is an illustration of a use of my apparatus; Figure 9 is a schematic showing of another form of my invention; and Figure 10 is a showing of a preferred form of corrector magnet and cooperating armature.

The measurement of a distance by the propagation and reception of waves is not new. Waves, whether they be electromagnetic (as light or radio waves) or mechanical (as sound waves), travel at a known speed in the medium in which they are propagated. If the instant of propagation of a wave is known the time interval elapsing before the reception of the wave provides an indication or measurement of the distance it traveled. While this principle may be utilized in connection with any form of wave, it is particularly feasible to make use of mechanical waves in an elastic medium such as air or water, since these waves travel at a considerably slower rate than do electromagnetic waves. Moreover, the propagation of the wave may be either at a point remote from the reception point, or immediately adjacent the reception point. In the latter case, of course, the wave makes a round trip and allowance must be made for the fact that it has twice traveled the distance desired to be measured. This latter system, taking advantage of echo or reflection phenomena, is particularly adapted for use in determining the depth of water beneath a boat, for example. It will be understood, however, that the principles here enunciated, in the apparatus described, are equally applicable to determination of distances in air, as from a ship to a cliff or ice berg, or from an airplane to the ground, by use of any form of wave.

In the particular embodiment of my invention illustrated in Figures 1 and 2, a motor 10, preferably incorporating speed reduction mechanism, rotates a shaft 11 at some approximately fixed rate, which may for example be one revolution per second. This shaft drives a cam 12 and, through a friction clutch 13, a rotating member or electromagnet 14. The rotating electromagnet is rigidly mounted on the same shaft carrying an armature 15 cooperating with the first electromagnet 16. This electromagnet is fixed in the sense that it does not rotate during operation of the device; but manual adjusting means, comprising the rotatable knob 17, the shaft 18, and the gears 19 and 20, enable adjustment of the position of the first electromagnet 16 to enable proper initial zero setting of the indicator, as will be hereafter described.

That part of the device which may more properly be termed the indicating means includes a pointer or indicating means 21 and an armature 22, both rigidly mounted on the rotatable shaft 23. The indicator needle is adapted to cooperate with a graduated scale 24; and the armature 22 is within the field of and adapted to cooperate with the poles 25 and 26 of the rotatable electromagnet 14.

Referring now more particularly to the system as a whole, rotation of the cam 12 periodically closes the input circuit of the signal generator 27, which in turn causes propagation of the desired wave from the transmitter 28. For purposes of illustration this wave is assumed to be a sound wave propagated in water. At the instant the wave is propagated it is picked up by a microphone 29 and delivered to the input of amplifier 30. It will be noted that contacts 31 and 32 keep the microphone 29 short-circuited except at the instant of signal propagation, when these contacts are separated by the cam at the same time it closes contacts 33 and 34 in the input circuit of the signal generator. The amplifier is preferably of the type which provides, upon each actuation, only a single very brief electrical impulse. Such an amplifier is illustrated, for example, in my Patent No. 2,058,616, or in Turner Patent No. 1,794,502. When this impulse passes through the coil of the fixed electromagnet 16 it lines up the armature 15 therewith, even if such armature should at that instant be slightly out of line with the poles of the fixed electromagnet. The friction clutch 13 has sufficient power normally to hold the armature 15 in rotation with the shaft 11, but it permits relative movement under impulses of the electromagnet 16 when the armature 15 is out of step with said impulses. Thus this correcting impulse compensates for any delays or irregularities which might be present in the generation of the sound wave, for example, causing the rotating electromagnet 14, rigidly mounted on the same shaft as the armature 15, to be exactly synchronized with the periodic sound propagation.

Assuming that the sound wave then travels down to a reflecting surface in the water, as the sea bottom over which the ship is traveling, it will soon return by reflection to the neighborhood of a point of origin, and be received by a second microphone 35. This microphone is connected to the input of a second amplifier, here indicated as 36, relay apparatus 37 being so arranged as to prevent operation of this circuit at the time of initiation of the wave. The second amplifier is preferably identical with the first amplifier, so that any lags or differentiations introduced in one will be similarly introduced in the circuit of the other. The electrical impulse in the output of the second amplifier, occurring when the reflected sound wave is received, is then delivered by any appropriate means, as brushes and slip rings, to the coils of the rotating electromagnetic member 14. There is thus generated in this electromagnetic member an electromagnetic impulse at a time interval after that created in the first electromagnet, the time interval corresponding to the distance through which the wave traveled to the sea bottom and back.

The shaft 23 carrying the indicator hand 21 and armature 22 is preferably frictionally held in place. This friction is so arranged, by any desired adjustable means, so as to be not so great as to prevent the armature 22 from moving into alignment with the poles 25 and 26 of the rotating electromagnet when it is momentarily energized; but the friction should be sufficient to prevent the parts 21 and 22 from vibrating out of position, or from overrunning the desired position when they are moved by energization of the electromagnetic member 14.

In operation the position of the fixed electromagnet 16 would first be set so that, at the precise instant of propagation of the sound wave, the alignment of the rotating electromagnet therewith would bring the poles 25 and 26 to such a position that, if the armature 22 were in alignment therewith, the indicator hand 21 would point to zero on the scale 24. The amount of rotation of the rotating electromagnetic member 14 from this position is a function of the time it takes the sound wave to travel to the bottom, be reflected, and return to the microphone 35; so that when the impulse from the second amplifier energizes the rotating electromagnet the point to which the indicating hand is pulled is a function of this time interval, and thus of the distance of the bottom beneath the ship. The speed of travel of the wave in the particular medium, as a mechanical sound wave in water, being known, the scale 24 may be calibrated directly in this distance. With a shaft rate of rotation of one cycle per second the distance which could be indicated would have to be less than half the distance the wave would travel in water in one second. In the case of water this would be a little in excess of four thousand feet per second. Should it be desirable to measure greater distances it is only necessary to rotate the shaft at a slower rate, and preferably to use a plurality of indicators, as will be described later.

It will be apparent that as long as the motor 10 operates, impulses will be sent out about once a second, and once each second the position of the indicator hand 21 with reference to the calibrated scale 24 will be corrected to provide a proper indication of the distance of the sea bottom beneath the ship at that instant. A continuous visible indication is thus afforded, it being only necessary to glance at the indicator at any given time to know the depth of water beneath the ship at that instant. If any other reflecting surface should be interposed it would, of course, immediately reflect upon the indicator. That is, if the ship should be in water several thousand feet deep, but should pass over a submarine at a depth of two hundred feet, the reflection of the wave from the submarine before its reflection from the sea bottom would cause an indication of its presence.

The apparatus described above would, of course, read the distance from the apparatus to the reflecting surface, as the sea bottom. If the apparatus is located above the bottom of the ship it is only necessary to move the scale bodily a corresponding distance, whereupon the pointer will give a direct indication of the distance beneath the bottom of the ship. One way of accomplishing such a correction is shown in my Patent 2,188,059.

My invention is equally applicable to means providing a continuous permanent record, as is illustrated in Figures 3 and 4. In Figure 3 permanent recording apparatus is shown in the form of a drum 40 provided with a helix of wire 41 on its surface and adapted to cooperate with a mechanically actuated printer bar 42. A strip of paper, as for example the strip 43 shown in Figure 4, is adapted to be passed between the drum and the printer bar at a steady but relatively slow rate. Any energization of the magnetic means associated with the printer bar causes a mark on the paper at the particular point at which the wire helix happens to engage the paper beneath the printer bar at such instant. This permanent recording device may, for example, be of the same general type as is shown in Young Patent 1,967,072.

In the operation of the apparatus shown in Figure 3 a station at some remote point, as a lighthouse, is provided with a motor 44 driving two commutators or cam arrangements 45 and 46, causing periodic simultaneous actuation of radio transmission means 47 and signal generating and sound transmitting means 48 and 49.

The boat or other moving body includes a motor 50 rotatable in substantial synchronization with the periods of propagation of the wave from the remote point, and coupled through a friction clutch 51 to a rotatable unit including the previously mentioned drum 40 and an armature 52. The armature 52 rotates within the field of a fixed electromagnet 53, and this electromagnet is adapted to be energized with an impulse of very brief duration, by radio receiving and amplifying means 54, upon reception of the radio wave at the boat. The rotation of the drum 41 is thus exactly synchronized with the propagation of the waves at the lighthouse or other remote point, any time required for the radio wave to travel the distance being negligible for all practical purposes.

A microphone 55 is provided for reception of the sound wave, and this is then passed through an amplifier 56 to provide an electrical impulse of brief duration coincident with the reception of the sound wave at the ship. It is this latter impulse which actuates the electromagnet moving the printer bar 42.

It will be understood, of course, that this general system of providing a permanent record is equally adaptable to use with the same general arrangement disclosed in Figure 1, another method of wave propagation being shown merely to illustrate the various ways in which my invention may be used. That is, it will be understood that a mechanical wave could be generated on the ship or other moving body and the rate of rotation of the drum synchronized with its propagation by a microphone and fixed sound amplifier, as shown in Figure 1; and then the instant of reception of any reflected portion of the mechanical wave would be indicated on the record strip by operation of the printer bar upon reception of such wave, the printer bar in such arrangement being indicating means replacing the pointer and graduated scale of the first embodiment of my invention.

In either event, a record may be formed of the kind shown in Figure 4. The dotted line 57 is the zero or reference line, and the marks making up the line 58 show the distance from some reflecting surface, as the bottom of the sea. If any unusual difference in time travel is present, as might be caused by earlier reflection of the wave from a steepsided reef or from a submerged submarine, it will be indicated as by the portion 59.

Another embodiment of my invention is illustrated in Figures 5 and 6. In this case my invention is used to provide a continuous automatic comparison of the distance of a moving body, as the ship 60, from two points, as for example the marker buoys 61 and 62 on opposite sides of a channel.

As is better shown in Figure 6, each buoy may be provided with radio receiving and sound transmitting apparatus, as the receiver 63 and sound transmitter 64 in the buoy B, and the receiver 65 and sound transmitter 66 in the buoy A. These sound transmitters are so arranged as to provide two different signals over readily separable frequencies.

The ship is provided, as before, with a motor 67, rotating cam mechanism 68 friction-coupled to a rotating unit including the electromagnet 69 and armature 70. Upon each rotation of the cam unit a radio signal is sent out by the transmitter 71 which is received at the buoys and initiates simultaneous sound transmission therefrom. The sound from the buoy A, for example, is picked up by a microphone 72 on the ship and passed through a sound receiver and filter to provide an electrical impulse of very brief duration energizing the fixed magnet 73. The rotation of the rotatable member, including the electromagnet 69, will thus be exactly synchronized with reception of the sound wave from the buoy A to provide a zero reference. The sound from buoy B, on the other hand, is picked up by the microphone 74, passed through another sound receiver and filter, and a brief electrical impulse coincident with the reception of this sound is supplied to the electromagnet 69. As will be understood from my earlier description, this causes the indicator needle 75 to assume a position with reference to its cooperating scale which depends upon the time interval between the synchronizing and indicating impulses. As long as the ship stays in the center of the channel between the two marker buoys the indicator needle will, of course, remain at the zero point of the scale. As the ship gets off the center line to one side or the other the indicator needle will correspondingly move to one side or the other of the zero line to provide the desired indication.

Assume, for instance, that magnet 69 rotates clockwise. If buoy A is nearer to ship 60 than buoy B the zero setting impulse to magnet 73 comes first. After some time has elapsed the signal from buoy B arrives and energizes magnet 69. Since the time the zero setting took place this magnet has moved clockwise, and therefore pointer 75 will line up at some point of the scale to the right of the zero mark. In case the distance to buoy B were the short one magnet 69 would be energized before the zero setting and thus line up pointer 75 to the left of the zero mark of scale 76. Obviously it does not matter whether the zero setting of magnet 69 takes place before or after magnet 69 is energized as long as motor 67 rotates accurately enough so that no appreciable error is accumulated during one revolution, as where it is a synchronous motor operated from a frequency standard.

The distance from the zero mark of scale 76 to pointer 75 shows the difference in distance from ship 60 to buoys A and B. If buoy A is the "zero setting" station then the distance from the ship 60 to buoy 61 is the shorter distance if the hand shows to the right of the zero mark of scale 76, and vice versa. Thus the instrument shows not only the difference in distance but also which buoy or station is the more distant one.

It will be apparent that if marker buoys of this type are used to mark a harbor entrance channel, for example, a ship could pass up the channel with confidence, even in heavy fog.

The radio transmitter 71 and the radio receivers 63 and 65 may be omitted and an arrangement made to make the buoys transmit simultaneous periodic signals. The advantage with using the radio transmitter and radio receivers is that the interval of the emitted sound waves can be determined from ship 60 by the speed of cam 68, and no power need be wasted in emitting signals when no ship is near.

Turning now to Figure 7, I have illustrated a modified form of my invention operating in general like the form shown in Figures 1 and 2 and described in connection therewith, but having certain additional parts to make it particularly applicable to the measurement of relatively long distances. In this form of my invention shown in Figure 7 the motor 80, cam arrangement 81 and associated contact points correspond to the motor 10 and the cam 12 in my first described embodiment. Again the motor is driven from some source of fairly standard frequency, but in this case the cam is driven at a slow rate, for example, once each ten seconds. Under these circumstances once every ten seconds a signal is generated by the apparatus 82 and at the same time a corrector impulse is supplied to the coil 83 of the corrector magnet 84. Again this serves to correct the rate of rotation of the armature 85, friction driven from the motor 80. As before the reflected waves energize a device 86 which results in the creation of a brief electrical impulse energizing the rotating electromagnet 85 to line up the armature 87 and cause the pointer to assume a position on the scale giving an indication of the time traveled by the wave, and thus the distance of the reflecting surface.

In this particular form shown in Figure 7 a similar indicating arrangement, indicated in general as B, is driven through gears at a speed ten times as fast as the first indicating apparatus A. That is, the rotating electromagnet of the second indicating arrangement rotates once per second. This is in turn coupled through one to ten gears to the rotating electromagnet of a third indicating arrangement identified in general as C, so that its electromagnet rotates at the rate of ten revolutions per second. The fixed electromagnets of both of these arrangements are provided with zero setting corrective impulses at the same time the coil 83 receives an impulse; and both of the rotating electromagnets of these last two indicating arrangements are provided with indicating impulses at the same time such an impulse is provided to the rotating electromagnet 85.

With this arrangement different scales are used, of course, on the different indicating arrangements. That of indicator A, for example, might show a full scale distance of ten thousand feet, that of indicator B a scale of one thousand feet, and that of indicator C a scale of one hundred feet. By this arrangement the thousands of feet may be read on the first scale, the hundreds on the second, and the tens on the third; and all can be read directly with a high degree of accuracy.

Figure 8 illustrates a method of location of an unknown position by use of my apparatus in connection with at least two remote stations or points of wave transmission. If lighthouses or beacon stations transmit both sound and radio signals in such a way that the signals of the two stations are distinguishable, as by having these signals on different frequencies or by having one station transmit for a minute and then the other station transmit for a minute, a ship can readily determine its location, even in a fog or the like. By the use of the apparatus the distance A from the lighthouse or beacon station A may be first read from the indicator, and an arc laid out on the chart corresponding to this distance; then the process may be repeated to read the distance B, and an arc struck on the chart with this known point B as the center. Where the arcs cross is, of course, the location at that instant. This provides a very quick and easy method of locating a ship's position with respect to two known stations within the range of satisfactory reception of a sound signal.

Figure 9 is included to show that all of the advantages of my invention can be accomplished by the use of light and sound waves, as well as by radio and sound waves. That is, a lighthouse could emit simultaneous periodic light flashes and sound signals, and a ship equipped with indicating apparatus responsive to light could easily directly read its distance from the lighthouse unless conditions were such as to prevent the light or sound from reaching the ship. In connection with this embodiment of the invention wave impulses would be simultaneously transmitted from a light transmitter 90 and a sound transmitter 91. The apparatus in the upper part of the figure would, of course, all be carried by the ship, and would include a photoelectric cell or other light-sensitive device 92 and a microphone or sound sensitive device 93. As before, these and associated amplifiers would convert the waves into brief electrical impulses, that created by the light actuating the winding 94 to provide the zero setting or correction, and that created by the sound energizing the coils 95 of the rotating electromagnet to cause the pointer 96 to give the desired indication.

In Figure 10 I have shown a preferred form of corrector magnet and cooperating armature. It will be noted that the corrector magnet core 101 is provided with enlarged pole faces cooperating with similar large pole faces on the rotating armature 102, so that effective attractive force is provided even if the armature is seventy or eighty degrees out of alignment with its proper position at the time of the zero impulse, even though there are only two pole faces. The large pole faces on the corrector magnet, however, are provided with small central extending portions 103; and the large pole faces of the armature are provided with cooperating similar central extending portions 104. The interaction between the large pole faces is effective if the armature is widely out of alignment with its position at the time of the corrective impulse; yet the provision of the small cooperating parts 103 and 104 insures pulling of the armature into precise correct zero alignment.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Apparatus of the character described for providing a continuous automatic indication of a distance measurable by the propagation and reception of waves, including: means for periodically initiating the propagation of a wave; a member rotatable in approximate synchronization with such periodical propagation; means responsive to the propagation of said wave for exactly synchronizing an instantaneous position of said member with such propagation; and means operatively associated with said member for giving an indication proportional to an instantaneous position of said member, said last mentioned means being responsive to the reception of said wave.

2. Apparatus of the character described for providing a continuous automatic indication of a distance measurable by the propagation and reception of waves, including: means for periodically initiating the propagation of waves; a member rotatable in approximate synchronization with such periodical propagation; means for providing an electrical impulse by and coincident with said propagation; means actuated by said impulse for exactly synchronizing an instantaneous position of said member with such propagation; means for receiving said wave and providing a second electrical impulse upon such reception; and means operatively associated with said member for giving an indication proportional to the position of said member when the second impulse is operative, said last mentioned means being actuated by said second impulse.

3. Apparatus of the character claimed in claim 2, wherein the two means for providing electrical impulses have substantially identical time characteristics.

4. Apparatus of the character claimed in claim 2, wherein the rotatable member carries an electromagnet adapted to be momentarily energized by the second impulse, and wherein the last mentioned means includes an armature mounted substantially concentrically with the rotatable member and within the field of the electromagnet, and means for frictionally normally maintaining the armature at rest, the friction being not so great as to prevent the armature from moving into alignment with the electromagnet when it is momentarily energized.

5. Apparatus of the character described for providing a continuous automatic indication of a distance measurable by the propagation and reception of waves, including: means for periodically initiating the propagation of a mechanical wave; a fixed electromagnet; a rotatable unit comprising an armature in the field of said electromagnet, and a second electromagnet; means responsive to initiation of said wave for providing an electrical impulse of brief duration to the fixed electromagnet to exactly synchronize an instantaneous position of said unit with said propagation; means for receiving any reflected portion of said wave and providing a second electrical impulse of brief duration to the second electromagnet; and rotatably mounted indicating means including an armature in the field of said second electromagnet, the frictional resistance to rotation being not so great as to prevent the armature from moving into alignment with the second electromagnet when it is momentarily energized to provide an indication proportional to the position of the rotatable unit when the second impulse is received, but sufficient to prevent any substantial overrunning.

6. Apparatus of the character claimed in claim 5, wherein the two means for providing electrical impulses have substantially identical time characteristics.

7. Apparatus of the character claimed in claim 3, including a second indicating assembly including a member rotatable in approximate synchronization with such propagation and means operatively associated with the member for giving an indication, wherein the two rotatable members rotate at different rates bearing a predetermined relation, and wherein said impulse simultaneously actuates both indicating means.

8. Apparatus of the character described for providing a continuous automatic indication of a distance measurable by the propagation and reception of waves, including: means for periodically initiating the propagation of a wave; a member rotatable in approximate synchronization with such periodical propagation; a second member rotatable at a rate bearing a fixed ratio to that of said first member; means for providing an electrical impulse by and coincident with said propagation; means actuated by said impulse for exactly synchronizing an instantaneous position of said members with such propagation; means for receiving said wave and providing a second electrical impulse upon such reception; and separate means operatively associated with each of said rotatable members for giving an indication proportional to the position of the member with which it cooperates when said second impulse is received, said last mentioned means being simultaneously actuated by said second impulse.

9. Apparatus of the character described for providing an automatic indication of a distance measurable by the propagation and reception of waves, including: means for periodically initiating the propagation of a mechanical wave; means for simultaneously periodically initiating the propagation of an electromagnetic wave; a member rotatable in approximate synchronization with such periodical propagation; means responsive to said electromagnetic wave for exactly synchronizing an instantaneous position of said member with such propagation; means operatively associated with said member for giving the desired indication; and means responsive to said mechanical wave for actuating said indicating means to provide an indication proportional to the position of the member when said mechanical wave is received.

ERNST NORRMAN.

CERTIFICATE OF CORRECTION.

Patent No. 2,326,880.   August 17, 1943.

ERNST NORRMAN

It is hereby certified that error appears in the printed specification of the above numbered patent requiring correction as follows: Page 5, second column, line 4, claim 7, for the claim reference numeral "3" read --2--; and that the said Letters Patent should be read with this correction therein that the same may conform to the record of the case in the Patent Office.

Signed and sealed this 5th day of October, A. D. 1943.

(Seal)

Henry Van Arsdale,
Acting Commissioner of Patents.

CERTIFICATE OF CORRECTION.

Patent No. 2,326,880.　　　　　　　　　　　　　　　August 17, 1943.

ERNST NORRMAN

It is hereby certified that error appears in the printed specification of the above numbered patent requiring correction as follows: Page 5, second column, line 4, claim 7, for the claim reference numeral "3" read --2--; and that the said Letters Patent should be read with this correction therein that the same may conform to the record of the case in the Patent Office.

Signed and sealed this 5th day of October, A. D. 1943.

(Seal)　　　　　　　　　　　　　　　　　　　　　Henry Van Arsdale,
　　　　　　　　　　　　　　　　　　　　　Acting Commissioner of Patents.